US012231617B2

(12) United States Patent
Kang et al.

(10) Patent No.: US 12,231,617 B2
(45) Date of Patent: Feb. 18, 2025

(54) SYSTEM AND METHOD FOR 3D POSE MEASUREMENT WITH HIGH PRECISION AND REAL-TIME OBJECT TRACKING

(71) Applicant: eBots Inc., Fremont, CA (US)

(72) Inventors: MingDu Kang, Pleasanton, CA (US); Kai C. Yung, Livermore, CA (US); Wing Tsui, Milpitas, CA (US); Zheng Xu, Pleasanton, CA (US)

(73) Assignee: eBots Inc., Fremont, CA (US)

( * ) Notice: Subject to any disclaimer, the term of this patent is extended or adjusted under 35 U.S.C. 154(b) by 354 days.

(21) Appl. No.: 18/016,269

(22) PCT Filed: Jul. 22, 2020

(86) PCT No.: PCT/US2020/043105
§ 371 (c)(1),
(2) Date: Jan. 13, 2023

(87) PCT Pub. No.: WO2021/016370
PCT Pub. Date: Jan. 28, 2021

(65) Prior Publication Data
US 2023/0269361 A1 Aug. 24, 2023

Related U.S. Application Data

(60) Provisional application No. 62/877,696, filed on Jul. 23, 2019.

(51) Int. Cl.
*H04N 13/363* (2018.01)
*G06T 7/521* (2017.01)
*H04N 13/296* (2018.01)

(52) U.S. Cl.
CPC .......... *H04N 13/363* (2018.05); *G06T 7/521* (2017.01); *H04N 13/296* (2018.05)

(58) Field of Classification Search
CPC .... H04N 13/363; H04N 13/296; G06T 7/521; G01B 11/245; G01B 11/2545; G02B 27/48
(Continued)

(56) References Cited

U.S. PATENT DOCUMENTS 6,462,811 B1 * 10/2002 Turner ................. G01B 11/245
348/125
7,986,321 B2 * 7/2011 Zhuang ................... G06T 17/20
359/603
(Continued)

FOREIGN PATENT DOCUMENTS

CN     108398804 A  *  8/2018  ............. G02B 27/48

*Primary Examiner* — Susan E. Torgerson
(74) *Attorney, Agent, or Firm* — Shun Yao; Yao Legal Services, Inc.

(57) ABSTRACT

One embodiment can provide a machine-vision system that includes one or more stereo-vision modules. A respective stereo-vision module can include a structured-light projector, a first camera positioned on a first side of the structured-light projector, and a second camera positioned on a second side of the structured-light projector. The first and second cameras are configured to capture images of an object under illumination by the structured-light projector. The structured-light projector can include a laser-based light source and an optical modulator configured to reduce speckles caused by the laser-based light source.

18 Claims, 12 Drawing Sheets

(58) Field of Classification Search
USPC .......................................................... 348/51
See application file for complete search history.

(56) References Cited

U.S. PATENT DOCUMENTS

| 8,388,204 | B2* | 3/2013 | Case | G01N 21/9501 |
| | | | | 362/558 |
| 2011/0037953 | A1* | 2/2011 | Nizani | G02B 3/005 |
| | | | | 353/38 |
| 2014/0132501 | A1* | 5/2014 | Choi | G01B 11/2545 |
| | | | | 356/610 |
| 2017/0180708 | A1* | 6/2017 | Hazeghi | H04N 13/254 |
| 2020/0150450 | A1* | 5/2020 | Wiersma | H04N 9/3164 |

* cited by examiner

SYSTEM AND METHOD FOR 3D POSE MEASUREMENT WITH HIGH PRECISION AND REAL-TIME OBJECT TRACKING

BACKGROUND

Field

This disclosure is generally related to machine-vision systems. More specifically, this disclosure is related to a machine-vision system capable of performing three-dimensional (3D) pose measurement with high precision and real-time object tracking.

Related Art

Computer vision is a field of artificial intelligence (AI) that trains computers to interpret and understand the visual world. Using digital images from cameras and videos and applying deep-learning models, machines can accurately identify and position objects. Industrial automation and robot-assisted manufacturing are increasingly using such technologies to improve their factory throughput and flexibility to respond efficiently to customers' needs and desires, as well as to maximize yield. A high-definition camera can detect details that human eyes cannot, and a fast computer processor can interpret the images and perform various complicated tasks of inspection and assembly (e.g., object recognition, micron-level crack detection, surface-defect detection, etc.) as fast as a human brain, but with a much higher repeatability and accuracy.

With the rapid advancement of AI and machine-learning algorithms, the industry is pushing in two key directions: one toward training or teaching the robots, and the other toward developing a faster way to generate 3D models of the objects without sacrificing measurement resolution. The second approach is especially required when robots are dealing with 3D irregular and flexible objects, where accurate acquisition of 6-degree of freedom (6DOF) and rapid response to objects' motion are of vital importance.

SUMMARY

One embodiment can provide a machine-vision system that includes one or more stereo-vision modules. A respective stereo-vision module can include a structured-light projector, a first camera positioned on a first side of the structured-light projector, and a second camera positioned on a second side of the structured-light projector. The first and second cameras are configured to capture images of an object under illumination by the structured-light projector. The structured-light projector can include a laser-based light source and an optical modulator configured to reduce speckles caused by the laser-based light source.

In a variation on this embodiment, the optical modulator can include a rotating diffuser disc.

In a further variation, the optical modulator can further include a straight or curved light tunnel.

In a further variation, the optical diffuser can include two diffuser discs rotating at different speeds in opposite directions.

In a further variation, rotation speeds of the two diffuser discs can be controlled independently of each other.

In a further variation, the rotating diffuser disc is driven by a brushless direct current (BLDC) motor.

In a variation on this embodiment, the laser-based light source can be configured to emit a multimode, multi-wavelength laser beam.

In a variation on this embodiment, the machine vision system can further include a support frame to mount the one or more stereo-vision modules. The support frame can include at least an arc-shaped slot such that first and second stereo-vision modules mounted on the arc-shaped slot have a same viewing distance but different viewing angles when capturing images of the object.

In a further variation, optical axes of the first and second cameras of the first and second stereo-vision modules mounted on the arc-shaped slot are configured to converge at a single point.

In a further variation, the first and second stereo-vision modules operate in tandem, with the first stereo-vision module operating as a master and the second stereo-vision module operating as a slave.

In a further variation, while operating as a slave, the second stereo-vision module is configured to: turn off a structured-light projector of the second stereo-vision module, and synchronize first and second cameras of the second stereo-vision module with a structured-light projector of the first stereo-vision module.

In a variation on this embodiment, the structured-light projector can include: a digital micromirror device (DMD) for reflecting a laser beam outputted by the laser-based light source and modulated by the optical modulator, and a double-telecentric lens for expanding the laser beam reflected by the DMD while maintaining parallelism of the beam.

In a variation on this embodiment, the respective stereo-vision module further includes an image-acquisition-and-processing module, which includes a processor and multiple image-acquisition units integrated onto a same printed circuit board (PCB).

In a further variation, the image-acquisition-and-processing module can include: an image-sensor interface configured to facilitate high-speed data transfer to the processor, and a processor interface configured to facilitate high-speed communication between the processor and a host computer.

In a further variation, the image-sensor interface and the processor interface are peripheral component interconnect express (PCIe) interfaces.

One embodiment can provide a structured-light projector for a 3D imaging system. The structured-light projector can include a laser-based light source, an optical modulator configured to reduce speckles caused by the laser-based light source, a digital micromirror device (DMD) for reflecting a laser beam outputted by the laser-based light source and modulated by the optical modulator, and a double-telecentric lens for expanding the laser beam reflected by the DMD while maintaining parallelism of the laser beam.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the technical problem of providing high accuracy 3D pose measurement and tracking of an object in a real-time 3D workspace. More specifically, the disclosed embodiments provide a smart vision system that uses high-frame rate image sensors with laser structural light patterns to generate a high-resolution point cloud representing a tracked object. The smart vision system includes an optical-projection unit with a single- or multiple-wavelength laser source to address absorbance or reflection spectrum of various surface materials and to achieve optimum image quality. The smart vision system also includes an optical modulator in line with the laser beam to minimize or eliminate speckle effects from the laser source. The smart vision system further includes a double-telecentric projection lens system to allow a constant magnification as depth varies and to achieve a very low to near zero distortion of projected patterns on the object, and to improve the depth of focus (DOF) of the projected patterns. To minimize specular reflection and object occlusion, the smart vision system can include multiple image sensors located in multiple locations with their optical axes converging to a common point intersecting with the optical axis of the optical-projection unit.

3D Smart Vision Module

Figure 1A:
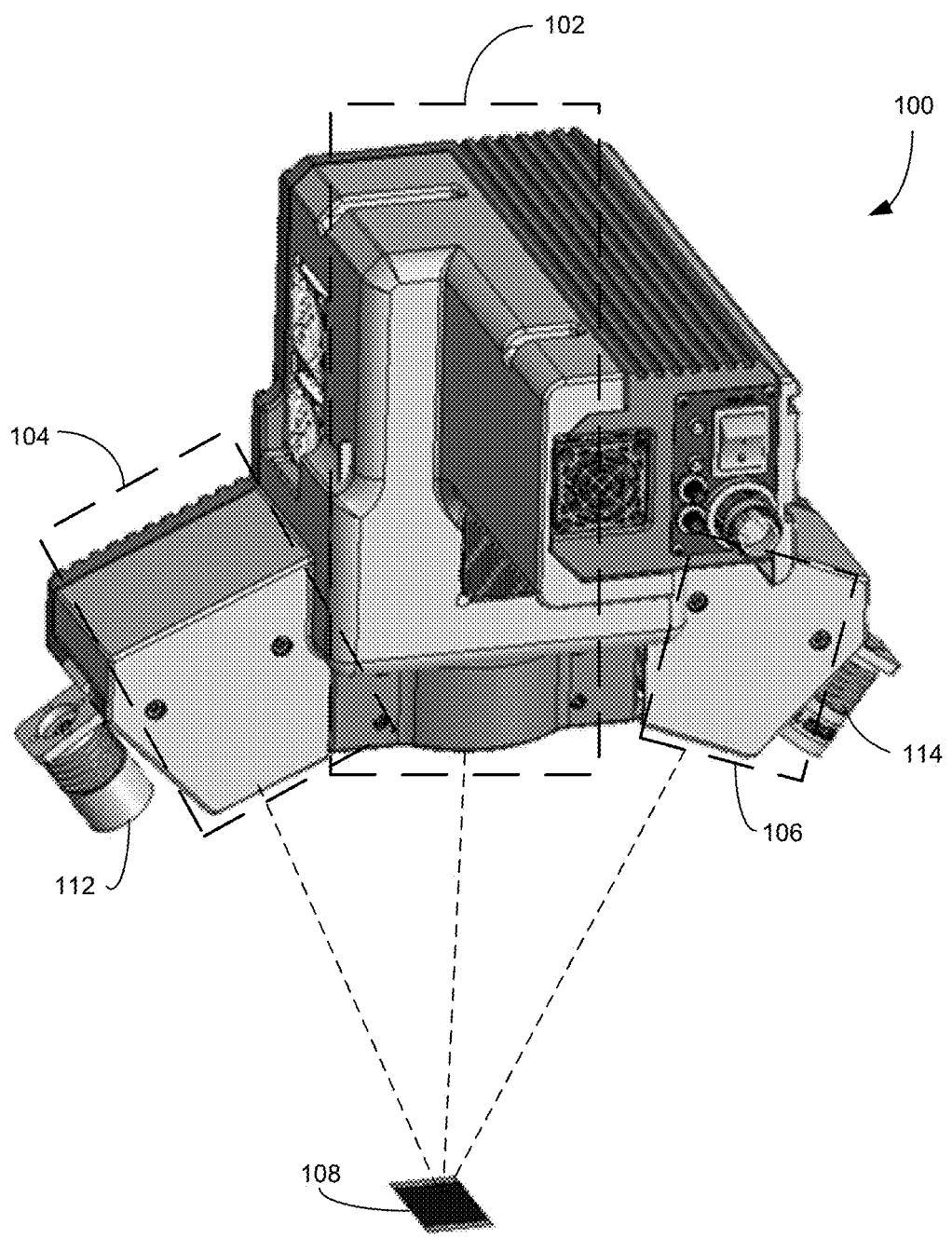
FIG. 1A illustrates the perspective view of an exemplary 3D smart vision module, according to one embodiment.

FIG. 1A illustrates the perspective view of an exemplary 3D smart vision module, according to one embodiment. Smart vision module 100 can include a structured-light projector 102, a stereo camera pair that includes a left-stereo camera 104 and a right-stereo camera 106, and a pair of spotlights 112 and 114. FIG. 1A also shows the field-of-view (FOV) 108 of smart vision module 100.

Figure 1B:
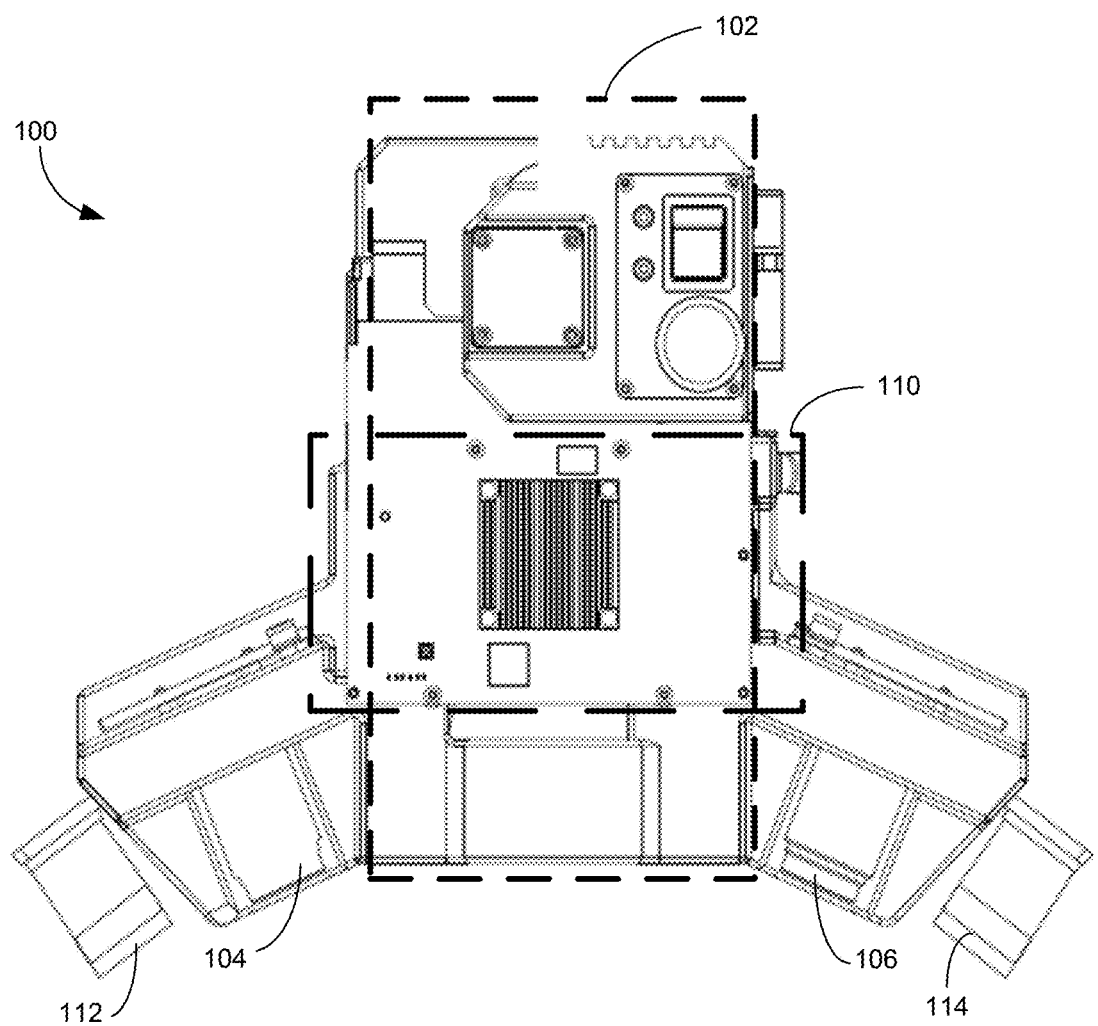
FIG. 1B illustrates the front view of exemplary 3D smart vision module 100, according to one embodiment.

FIG. 1B illustrates the front view of exemplary 3D smart vision module 100, according to one embodiment. FIG. 1B shows more clearly the relative locations among structured-light projector 102, left-stereo camera 104 and right-stereo camera 106, and spotlights 112 and 114. FIG. 1B also shows an image-acquisition-and-processing board 110 positioned between left-stereo camera 104 and right-stereo camera 106.

Structured-light projector 102 can be responsible for projecting structured light onto a scene whose images are to be captured. Structured-light illumination has been widely used to obtain 3D information about objects. The term "structured light" refers to active illumination of a scene with specially designed, spatially varying intensity patterns. An image sensor (e.g., a camera) acquires 2D images of the scene under the structured-light illumination. If the scene is a planar surface without any 3D surface variation, the pattern shown in the acquired image is similar to that of the projected structured-light pattern. However, when the surface in the scene is non-planar, the geometric shape of the surface distorts the projected structured-light pattern as seen from the camera. The principle of structured-light 3D surface imaging techniques is to extract the 3D surface shape based on the information from the distortion of the projected structured-light pattern. Accurate 3D surface profiles of objects in the scene can be computed by using various structured-light principles and algorithms.

In some embodiments, structured-light projector 102 can include a Digital Light Processing (DLP) projector, which can provide a high frame rate and a high resolution. The DLP projector can include a digital micromirror device (DMD) to codify the projecting patterns. A typical DLP projector can include a light source, a DMD for providing the pattern, and an optical lens/mirror system for expanding and guiding the light beam.

Conventional structured-light projectors often use a light-emitting diode (LED) as the light source, which typically provides a light intensity less than one milliwatt per square centimeter (e.g., 0.2 mw/cm$^2$). A low light intensity often leads to prolonged exposure time, and hence, a slower camera frame rate. To increase the light intensity, in some embodiments, a laser can be used as the light source of the structured-light projector. Compared with the LEDs, a laser can provide a much higher brightness and directionality, and can minimize the optical loss as the laser beam passes through the optical system of the projector. As a result, high intensity patterns can be projected on the object, and exposure time can be significantly reduced.

The higher intensity provided by a laser source can also ensure that the structured-light pattern can have a high contrast (e.g., between black and white stripes). Such sharper images with a better signal-to-noise ratio can correlate to a shorter exposure time, leading to a faster image-capturing speed. Moreover, in some embodiments, the laser source used in the structured-light illumination system can emit light of multiple wavelengths. For example, the laser source can sequentially change the wavelength of the emitted light. As the different material surface reflects light differently at a particular wavelength, the sequential change of the laser wavelength enables the smart vision module to delineate the object from background scene.

When the object is illuminated by the laser, the inherently rough surface of the object can cause the backscattered light to create a speckled pattern, which can include bright and dark regions. The speckle effect can create objectionable noise signals to the images captured by the smart vision system. Multimode lasers have shorter coherent lengths than single mode lasers, and can reduce the speckle effect slightly. To minimize speckles, in some embodiments, the structured-light projector can include an optical modulator that can break up the coherency of the laser light, thus reducing speckles. To destroy the spatial coherence, the optical modulator is designed to randomly distort or modulate the wavefront of the laser beam to form a high brightness directional beam with a short coherent length. In one embodiment, an optical diffuser was employed in the optical modulator, and random surface roughness on the diffuser was introduced to break the spatial coherence. The surface roughness can be in the order of the wavelength of the incoming laser beam. More specifically, the optical diffuser can be rotational (e.g., a rotating diffuser disc), with an angular velocity up to 20,000 RPM. To further increase the randomness of the optical diffuser, in some embodiments, the optical diffuser comprises two overlapping discs rotating in opposite directions, with the gap between the two rotating discs minimized to avoid divergence of the laser beam. In further embodiments, the rotation speed of the two discs can be independently controlled.

In addition to surface roughness, the optical diffuser can include randomized nanostructures deposited onto a glass surface to destroy the spatial coherence. For example, Titanium oxide particles with sizes ranging from 100 nm to 10 µm can be deposited on a glass surface to form an optical diffuser. In another embodiment, optical properties of the rotating disc can vary in the radial direction and the tangential direction. For example, a disc can be divided into multiple sectors. Each sector has a different optical property. When the disc rotates at a high speed, the laser spot scans through those different sectors having different optical properties, which is equivalent to the laser beam passing through all those different diffusers. The contribution of each sector is proportional to the arc length of each sector, and the total effect equals to the sum of the product of transmission and the arc length of all sectors. As the disc is divided into more sectors of different roughness, the wavefront becomes more random, and the coherent length of the laser beam decreases. Ultimately the coherent length of the laser beam is reduced to smaller than the surface roughness of the illuminated object, and the speckles can be eliminated.

Figure 2A:
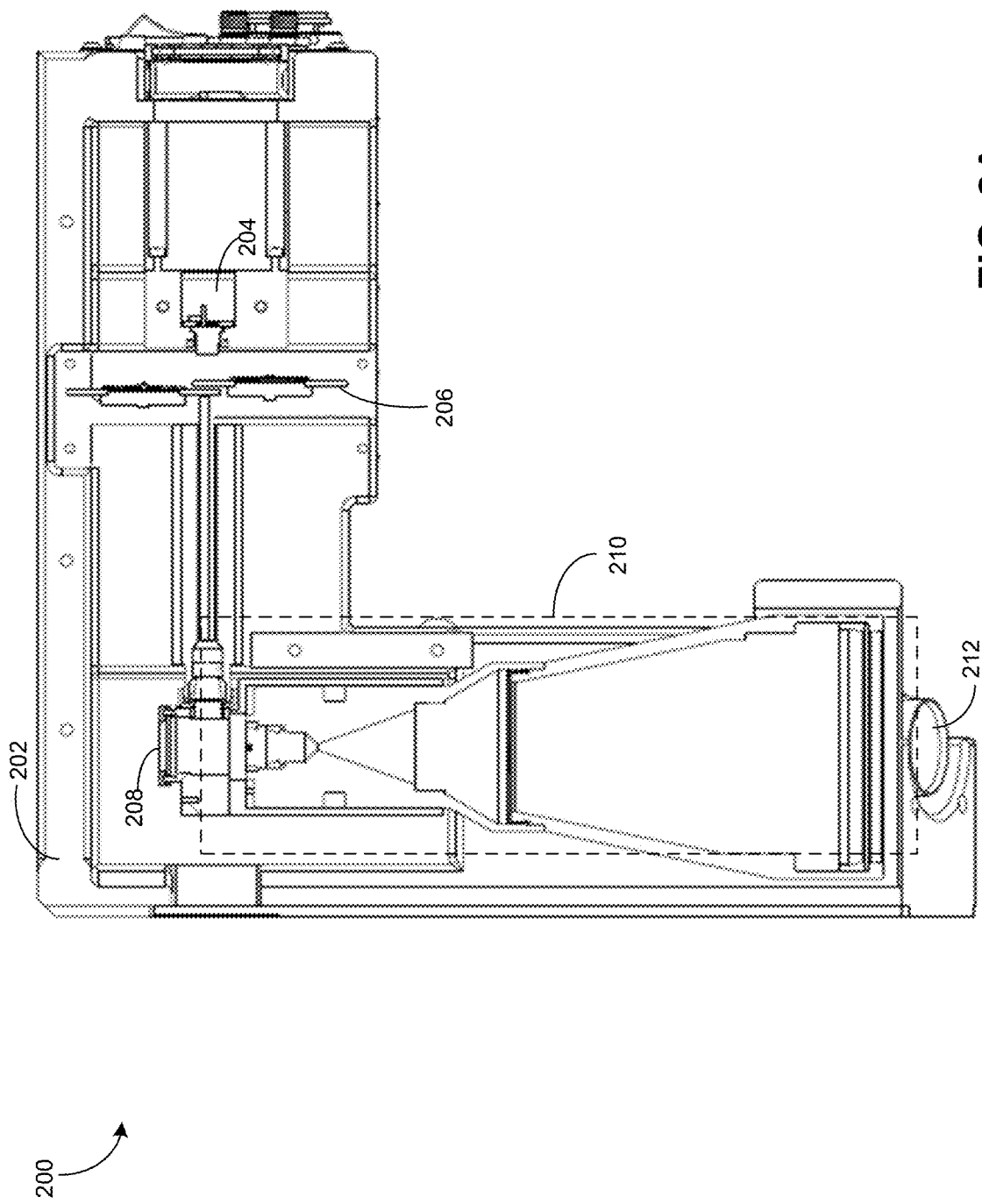
FIG. 2A illustrates the side view of an exemplary structured-light projector, according to one embodiment.

FIG. 2A illustrates the side view of an exemplary structured-light projector, according to one embodiment. Structured-light projector 200 can include a main frame 202 that encloses the various optical components, a laser module 204, an optical diffuser 206, a DMD 208, a beam expanding-and-guiding module 210, and a projector lens 212.

Figure 2B:
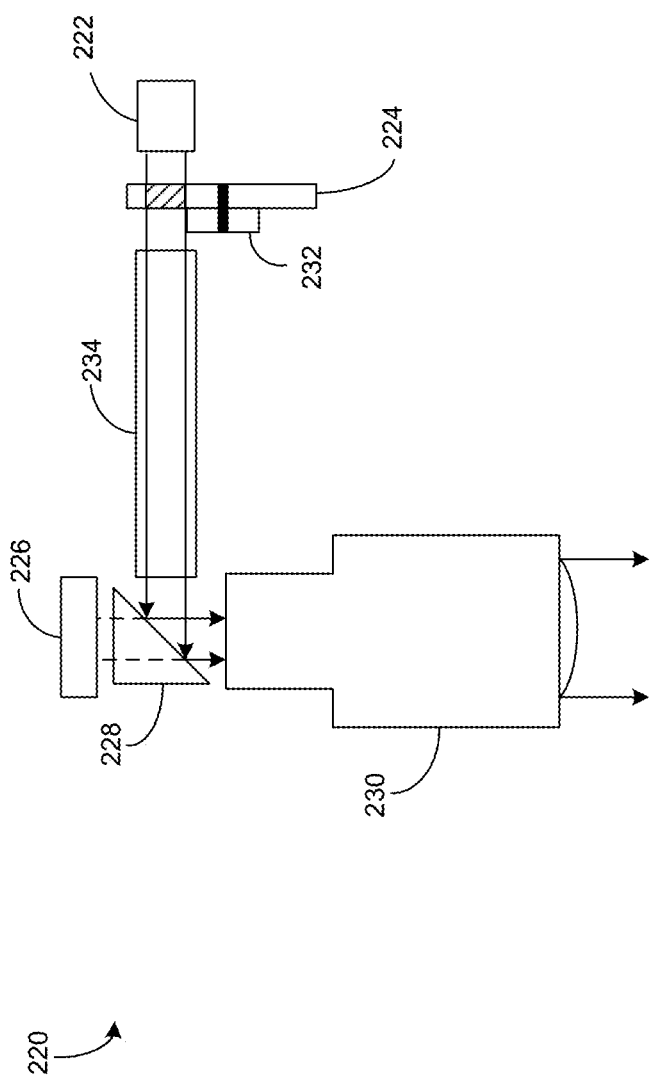
FIG. 2B illustrates a simplified diagram showing the various optical components within a structured-light projector, according to one embodiment.

FIG. 2B illustrates a simplified diagram showing the various optical components within a structured-light projector, according to one embodiment. Structured-light projector 220 can include a laser-and-collimator module 222, an optical diffuser disc 224, a DMD 226, a prism 228, and a beam expander 230.

Laser-and-collimator module 222 can include a laser and collimator, which converts light emitted by the laser to parallel beam. The laser can be a multimode laser. In some embodiments, the laser can have tunable wavelengths. In alternative embodiments, laser-and-collimator module 222 can include multiple lasers to generate multiple-wavelength light. To reduce size and power consumption, laser-and-collimator module 222 can include one or more diode lasers (e.g., a GaN laser). The collimator can be a condenser lens.

Diffuser disc 224 can include a holographic diffuser, where the surface texture is precisely controlled to achieve the maximum randomness while maintaining a pre-defined divergence angle. In some embodiment, the divergence angle at the exit side of the diffuser can range between 0.5° and 10°. As the laser beam passes this randomly textured surface, the wavefronts are broken up due to scattering, and the coherent length is reduced. Consequently, the speckles are reduced or even eliminated in the captured images. The hatched areas indicate where the laser beam interacts with diffuser disc 224 at a particular time instant. The randomly etched textures in the hatched area cause random scattering of the coherent laser beam, and the spinning of the diffuser disc ensures that the laser beam interacts with dynamically changing scatter pattern (i.e., each instant the laser beam is scattered by a different microstructure on the disc). In some embodiments, diffuser disc 224 can spin at a very high RPM (e.g., from a few hundred to a few thousand RPM). This introduces a time-dependent wavefront distortion or randomization, with the captured image being the superposition of many random distorted wavefronts, and as a result, the speckles in the image can be averaged out effectively. The randomly etched textures on diffuser disc 224 can be designed to ensure a narrow divergence angle of the laser beam.

FIG. 2B also shows that, upon exiting diffuser disc 224, the laser beam immediately enters a glass rod 234 functioning as a light tunnel, which can also be considered as part of the optical modulator for wavefront distortion. More specifically, the wavefronts of the laser beam are further randomized via many total internal reflections in the light tunnel. In one embodiment, the aspect ratio of the light tunnel can be at least 14. Instead of straight glass rod 234 shown in FIG. 2B, the light tunnel can also be curve-shaped (e.g., S-shaped). The minimum radius of the curvature can be controlled to maintain total internal reflection. In alternative embodiments, the light tunnel can also be a bundle of optical fibers.

Mechanical stability can be very important to a camera system, because vibrations can cause blurriness of the captured images. In some embodiments, the rotation of diffuser disc 224 can be driven by a multi-pole brushless direct current (BLDC) motor 232. Compared with other types of motor (e.g., a brushed DC motor or an induction motor), the BLDC motor can be highly efficient, compact in size, low noise, and can have a higher speed range. To minimize vibration, multi-pole BLDC motor 232 can be mounted on fluid dynamic bearings (FDBs). In one embodiment, BLDC motor 232 can be designed to be small and flat, as shown in FIG. 2B. The small size and stability of the motor makes it possible to position diffuser disc 224 very close (e.g., less than one centimeter) to laser-and-collimator module 222, thus minimizing the divergence angle of the laser beam and minimizing the loss. This design also allows diffuser disc 224 to spin with low noise and minimized wobbling, and increased life span of the bearings.

To further reduce the speckle effect, in some embodiments, the diffuser module can include multiple (e.g., two) spinning diffuser discs, with each diffuser disc being similar to diffuser disc 224 shown in FIG. 2B.

Figure 3A:
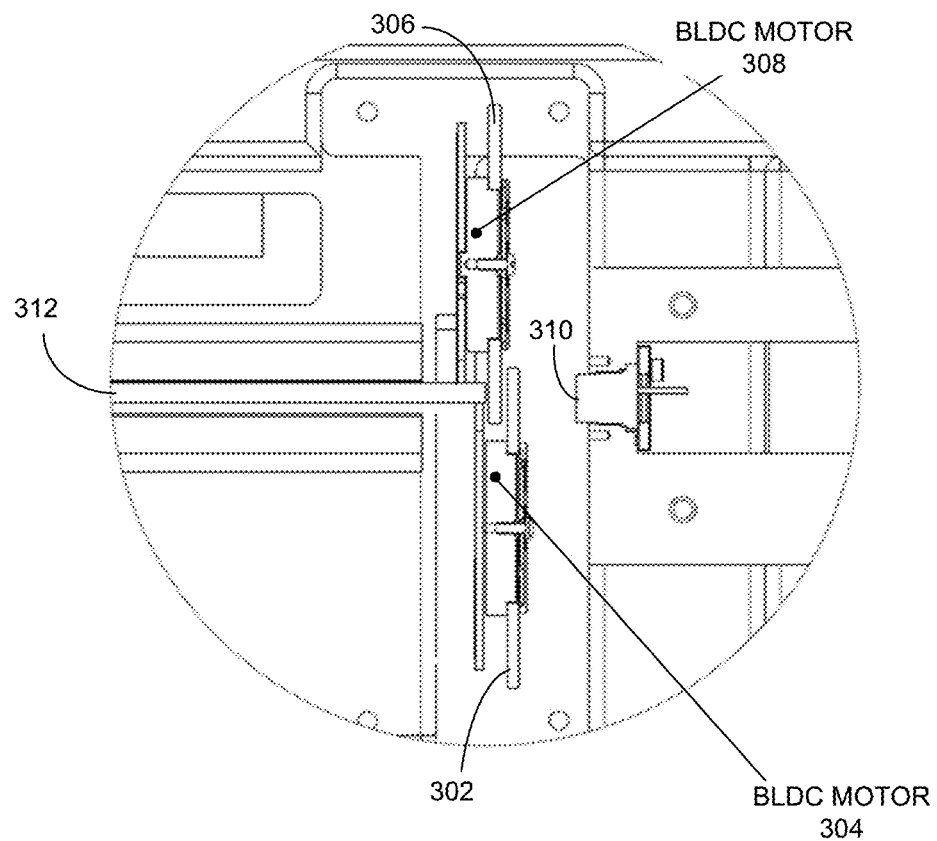
FIG. 3A shows the amplified view of two diffusers in the path of the laser beam, according to one embodiment.

FIG. 3A shows the amplified view of two diffusers in the path of the laser beam, according to one embodiment. In FIG. 3A, a diffuser disc 302 is coupled to and driven by a rotational motor 304 and a diffuser disc 306 is coupled to and driven by a rotational motor 308. Diffuser discs 302 and 306 partially overlap with each other, and the collimated laser beam out of collimator 310 passes through the overlapping portions of diffuser discs 302 and 306 before reaching other optical components.

Figure 3B:
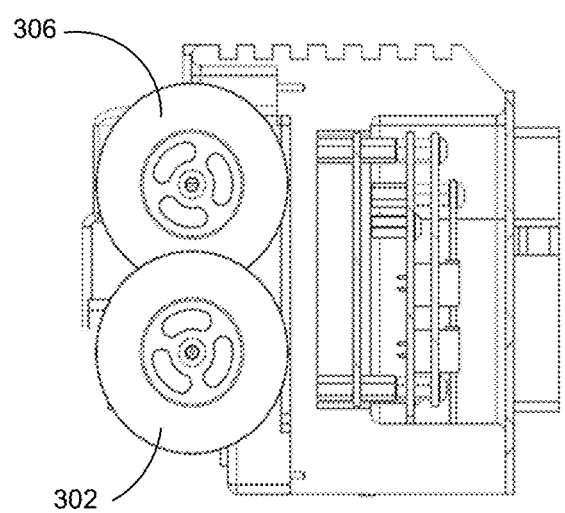
FIG. 3B shows the top view of the overlapping diffuser discs, according to one embodiment.

FIG. 3B shows the top view of the overlapping diffuser discs, according to one embodiment. More specifically, FIG. 3B clearly shows that the edges of diffuser discs 302 and 306 partially overlap each other. The laser beam hits and passes through the overlapping regions of diffuser discs 302 and 306 before continuing on each path.

Randomly etched patterns on the diffuser discs scatter the laser light. The high-speed rotations of the diffuser discs can result in a number of un-correlated (due to the randomness of scattering patterns) speckles being averaged within a captured frame, thus mitigating the speckle effect. Moreover, the two diffuser discs can rotate in different directions at different speeds. For example, diffuser disc 302 can rotate clockwise at a speed of 500 RPM, whereas diffuser disc 306 can rotate counterclockwise at a speed of 600 RPM. Other combinations can also be possible. For example, diffuser disc 302 can rotate counterclockwise at a speed of 5000 RPM, whereas diffuser disc 306 can rotate clockwise at a speed of 4000 RPM. Both discs can rotate at speeds up to 20,000 RPM. Alternatively, one diffuser disc can remain stationary while the other rotates. By controlling the rotation speed of the discs independently of each other, one can reduce the likelihood that the laser beam hits a similar combination of scatter patterns from the two discs. In further embodiments, the rotation speeds of the discs can also be time-varying. In addition to the two diffuser discs shown in FIG. 3B, multiple (e.g., more than two) discs can be deployed, with the multiple discs rotating at different speeds in different directions. The rotation speeds of the multiple discs can also be independently controlled.

Figure 3C:
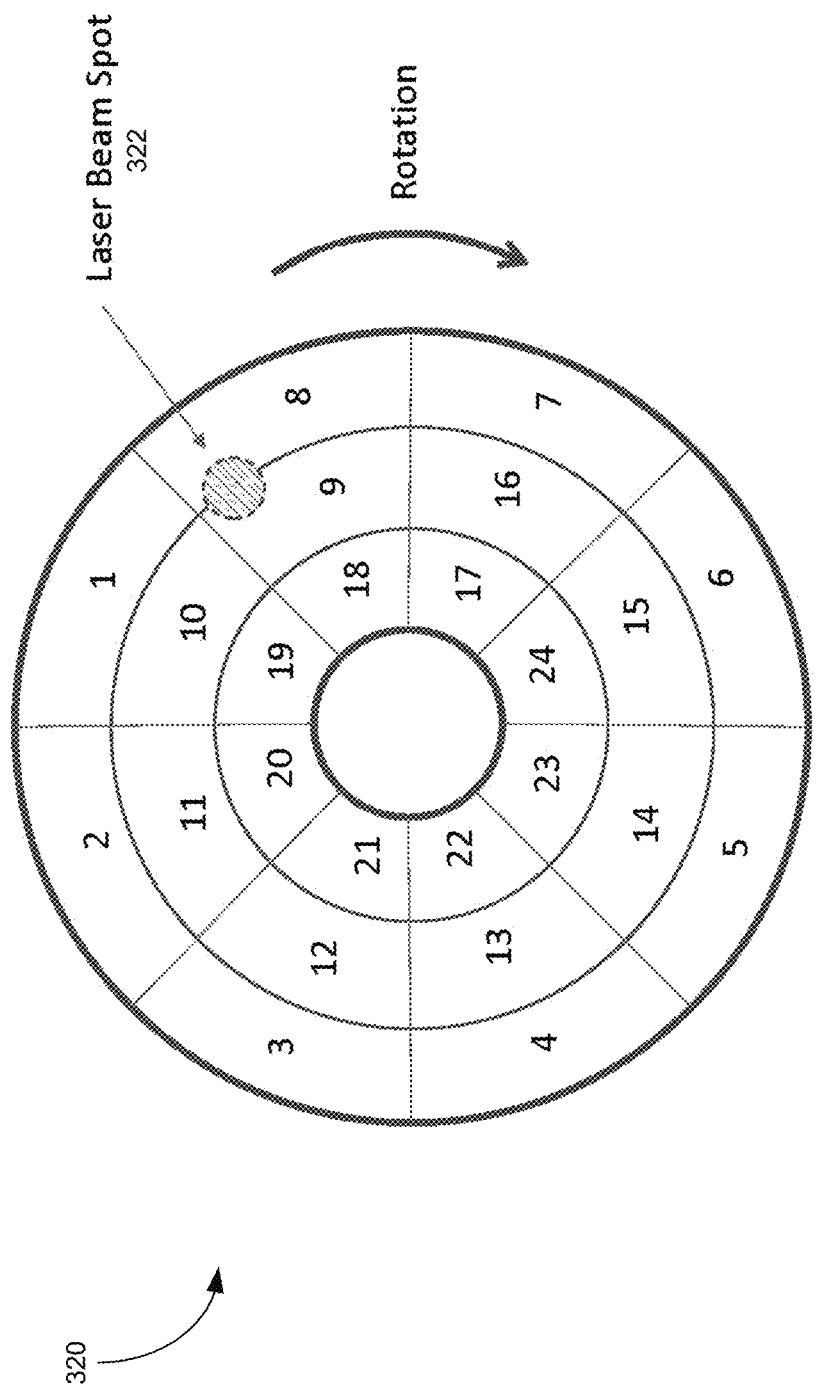
FIG. 3C shows the top view of an exemplary diffuser disc, according to one embodiment.

FIG. 3C shows the top view of an exemplary diffuser disc, according to one embodiment. In this example, diffuser disc 320 is divided into 24 sectors along with the radial direction and the tangential direction. Each sector has a different optical property (e.g., a different surface roughness parameter Ra, or a different refractive index). Note that the optical property can be any property that distorts the wavefront of a coherent beam. When the disc rotates at a high speed, as indicated by the arrow, laser beam spot 322 scans through those different sectors having different optical properties. The total scattering effect reduces the coherent length of the laser beam. Returning to FIG. 2B, after the laser beam passes through diffuser disc 224, it arrives at prism 228, which change the direction of the parallel laser beam, causing a portion of the laser beam to be reflected off DMD 226.

DMD 226 is a bi-stable spatial light modulator. In some embodiments, DMD 226 can include a two-dimensional (2D) array (e.g., a 1280×720 array) of movable micromirrors functionally mounted over a CMOS memory cell. Each mirror can be independently controlled by loading data into the CMOS memory cell to steer reflected light, spatially mapping a pixel of video data to a pixel on a display. Therefore, by switching the tilting directions of each individual micromirror, a pattern of bright (or white) and dark (or black) pixels can be created. In addition to the binary codification scheme where the projected light pattern includes black and white stripes, other encoding schemes are also possible. For example, instead of step functions (which results in black and white stripes), the intensity of the illumination pattern can be a sinusoidal function. In addition to stripes, other encoded patterns, such as dot array or grid, can also be used as the structured light for illumination.

Beam expander 230 can be used to expand the size of the parallel beam. Expanding the beam can decrease the divergence angle, thus increasing the depth of field (DOF) of the DLP projector. Various types of beam expander can be used to increase the size of the parallel beam, including but not limited to: a Keplarian beam expander, a Galilean beam expander, and a double-telecentric lens system. In some embodiments, beam expander 230 can include a double-telecentric lens system, which can expand the beam with little to no distortion and divergence.

Double-telecentric lens system 230 can provide constant magnification on the projection screen at various depths within the focused zone. Note that, even though the camera and projection optical units are calibrated, the non-telecentric approach can result in various resolutions of a measured image at various DOFs due to different lens magnifications. A telecentric lens system can improve this phenomenon as well as provide a very low or near zero distortion of projected patterns as depth varies. It also improves the depth of the projected field due to zero angle of projection.

Returning to FIGS. 1A and 1B, left-stereo camera 104 and a right-stereo camera 106 are located on either side of the optical axis of structured-light projector 102. In one embodiment, these cameras can be used for generating 3D point cloud models as well as performing two-dimensional (2D) wide-field part scan and object detecting. Left and right cameras 104 and 106 are mounted with a defined tilted angle with respect to the projection beam emitted by structured-light projector 102.

Note that, under the illumination by the structured light, one camera gets the 3D viewing from a particular angle, while the other side may be occluded. By using dual cameras (e.g., left and right cameras 104 and 106) and combining the 3D information from both cameras, more complete 3D information can be obtained (i.e. the completeness of point cloud of an object). In addition, dual cameras can provide the benefit of reducing the amount of specular reflection, which is a type of surface reflectance described as a mirror-like reflection. Such reflections can cause overexposure (e.g., the specular highlight) and are often undesirable. When two separate cameras are located on opposite sides of a structured-light projector, as shown in FIGS. 1A-1B, the specular reflection can be reduced. Because specular reflection is highly directional, specular light reflecting into one camera is less likely to reach the other camera. Hence, information associated with a region that causes specular reflection in one camera can be captured by the other camera. For example, the output image of one camera where the read out is saturated due to specular reflection can be compensated for by the output image of the other camera. When data from the two cameras are combined, one can construct a complete image of the scene without the specular highlight. A similar principle can be used to minimize occlusion.

In some embodiments, a 3D smart vision module can include multiple dual-camera pairs, which can create 3D visions at different accuracies and fields of view (FOVs). In the example shown in FIGS. 1A and 1B, 3D smart vision module 100 includes two dual-camera pairs, one pair including cameras 104 and 106 (referred to as the inner pair, and additional camera pairs can be added. A camera pair on the outside of cameras 106 and 106 can be referred to as an outer pair.

In some embodiments, the outer camera pair captures images under the illumination by structured light projected by structured-light projector 102, and can form 3D visions with accuracy down to a few microns. On the other hand, the inner camera pair captures images under normal illumination (i.e., no structured light), and can form a 3D vision in a large area at very high speed with reasonable accuracy.

In one embodiment, the inner camera pair can have a larger FOV than that of the outer camera pair. For example, each dimension of the FOV of the inner camera pair can be a few hundred of millimeters (e.g., 150×100 mm$^2$), whereas the dimension of the FOV of the outer camera pair can be a few tens of millimeters (e.g., 50×40 mm$^2$). The different FOVs and resolutions provided by the two camera pairs provide operational flexibility. For example, the inner camera pair can be used to scan a larger area to identify a component, whereas the outer camera pair can be used to zoom in to capture more detailed images of a single component.

Figure 4:
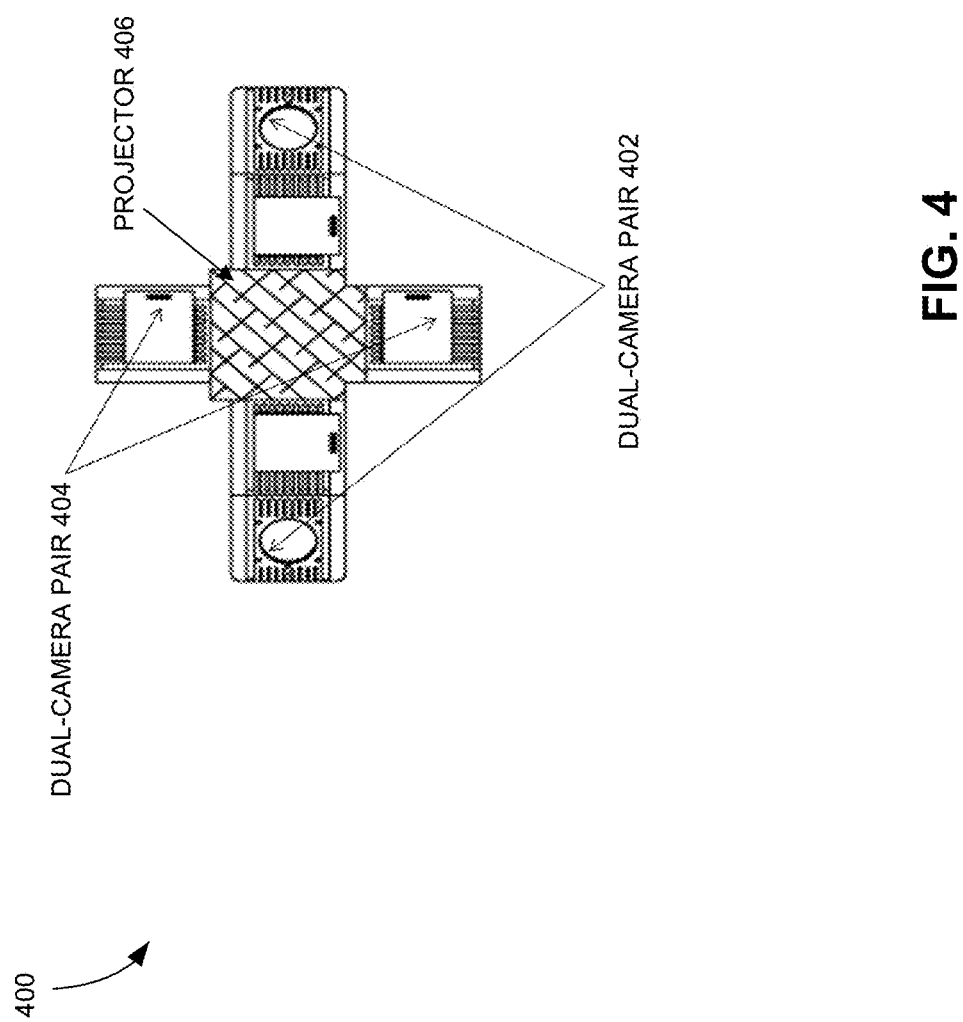
FIG. 4 illustrates exemplary arrangements of dual-camera pairs, according to one embodiment.

In addition to the arrangement shown in FIGS. 1A and 1B, the multiple dual-camera pairs can be arranged in other manners. FIG. 4 illustrates exemplary arrangements of dual-camera pairs, according to one embodiment. More specifically, FIG. 4 shows the top view of a smart vision module 400 with two different ways to arrange its cameras. Smart vision module 400 can include a dual-camera pair 402 arranged in a way similar to what is shown in FIGS. 1A and 1B. Alternatively, smart vision module 400 can include a dual-camera pair 404 arranged by rotating dual-camera pair 402 90° around projector 406. Other angles (e.g., 30°, 45°, 60°, etc.) are also possible.

In one embodiment, smart vision module 400 can include both dual-camera pairs 402 and 404, with both camera pairs operating in a synchronized way with projector 406 (meaning that for each structured-light pattern projected by projector 406, both camera pairs capture one or more images). In this way, a complete point cloud without occlusion can be formed.

To further expand the capacity of the machine-vision system, in some embodiments, a machine-vision system can include multiple (e.g., two or four) smart vision modules that can be configured to capture images in an alternating manner. More particularly, the multiple smart vision modules can have different viewing angles, with respect to the object, thus allowing the measurement of the object's 3D information from multiple angles and minimizing optical occlusion. Certain object features that are out of view of one smart vision module can be seen by the other.

Figure 5:
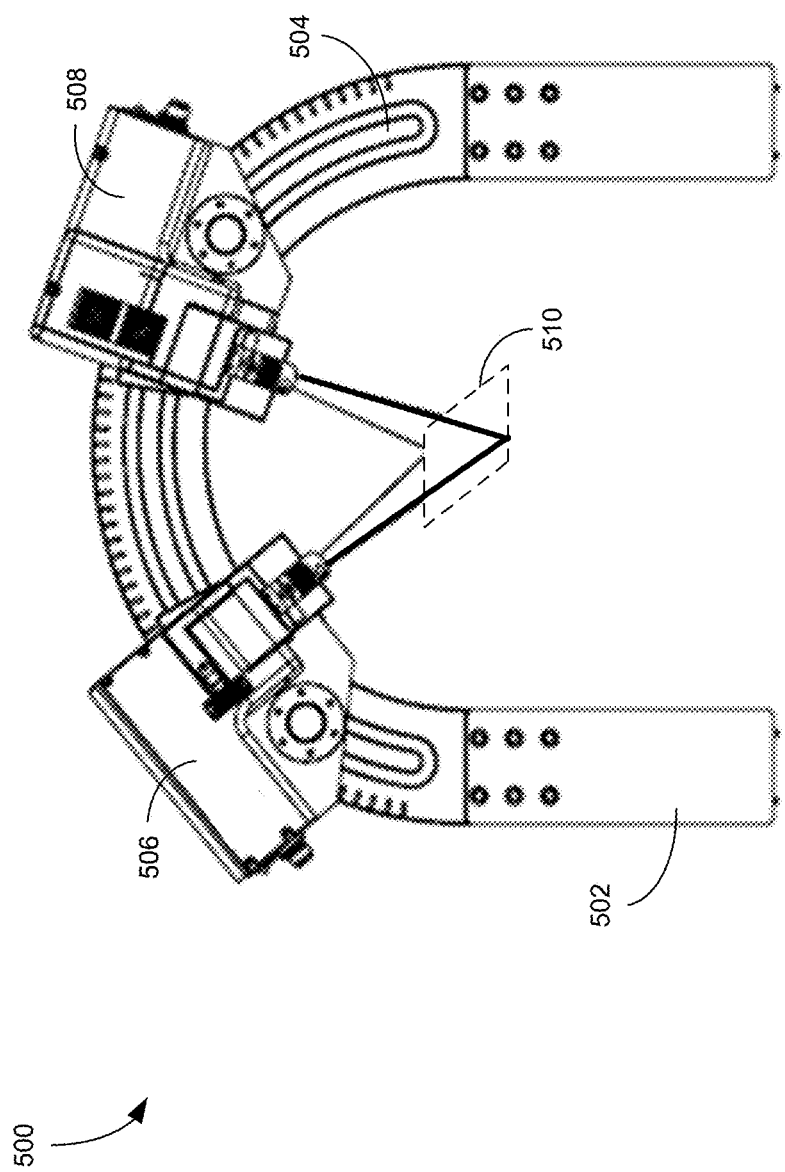
FIG. 5 illustrates an exemplary machine-vision system, according to one embodiment.

FIG. 5 illustrates an exemplary machine-vision system, according to one embodiment. Machine-vision system 500 can include a supporting frame 502 for supporting the multiple smart vision modules. In the example shown in FIG. 5, supporting frame 502 can include an arc-shaped slot 504 on which the multiple smart vision modules (e.g., modules 506 and 508) are mounted. The arc shape of slot 504 (i.e., being a portion of a circle) ensures that the viewing distances (i.e., the distance between the camera and the object under observation) of different modules are substantially the same, given that the object is located near the center of the circle. As shown in FIG. 5, smart vision modules 506 and 508 can share a same FOV 510, which is located near the center of the circle. Moreover, arc-shaped slot 504 also allows a smart vision module to change its viewing angle by sliding along slot 504 while its viewing distance remains the same.

In the example shown in FIG. 5, each smart vision module can be a dual-camera module comprising two cameras, similar to camera 104 and 106 shown in FIGS. 1A and 1B. The two cameras for each smart vision module can be aligned such that the camera plane (i.e., the plane defined by the optical axes of the two cameras) and the projection plane (i.e., the plane defined by the optical axis of the projector as the projector moves along slot 504) are perpendicular to each other. In fact, FIG. 5 shows the front view of machine-vision system 500, with the projection plane being the plane of the paper and a line connecting the two cameras going in and out of the plane of the paper. The optical axes of all four cameras of smart vision modules 506 and 508 converge at a single point (i.e., a point substantially at the center of the circle). Similarly, the optical axes of the two projectors of the two smart vision modules can also converge at the same point.

The ability to include multiple smart vision modules having different viewing angles and the ability to adjust the viewing angle of the vision modules without changing the FOV can provide the machine-vision system a greater flexibility in capturing images of different types of object. Some types of object may be viewed top down, whereas some types of object may be viewed at the wide viewing angle. For example, one may prefer to view objects with a deep recess in an angle along the recess in order to see the internal structure of the recessed region. Hence, depending on the way the object is positioned on the work surface, the tilt angle of the smart module can be adjusted in order to allow the cameras to capture images of the recessed region with minimal occlusion.

In some embodiments, the multiple (e.g., two) smart vision modules can operate independently. For example, the smart vision modules can be turned on in an alternating fashion, where each camera pair captures images under illumination by the structured-light from the corresponding projector. 3D images from the two vision modules can be combined to generate final images of the observed object.

Alternatively, the multiple (e.g., two) smart vision modules can operate in tandem, with one vision module being the master and other vision modules being the slaves. In one example, smart vision module 506 can operate as a master, whereas smart vision module 508 can operate as the slave. More specifically, the structured-light projector of smart vision module 506 is tuned on to project structured patterns on to the object and the structured light projector of vision module 508 is turned off. All four cameras (i.e., the four cameras of both vision modules) are synchronized to the projector of master vision module 506 to capture a sequence of images under illumination by certain structured-light patterns. By alternating the master-slave combination, up to eight point clouds from four cameras viewing from four different angles can be obtained. Through superposition of these point clouds, occlusion and specular reflection can be minimized.

Each smart vision module can be equipped with a processor configured to control operations of the projector and cameras as well as process the images captured by the dual cameras. More specifically, the processor can extract 3D information (e.g., generating a 3D point cloud of the object) from the captured images based on the projected structured-light patterns. In some embodiments, the processors of the vision modules can operate in tandem, with one processor operating in the master mode and the other processor operating in the slave mode. More particularly, the master processor controls the operations of the various controllers of the laser, the DMD, and the cameras within the master vision module. In addition, the master processor can send synchronized control signals to the slave processor, thus facilitating the slave processor in controlling the operations of the cameras of the slave vision module so that they are in sync with those of the master vision module. More specifically, the camera controller (i.e., the control unit that controls the timing of camera acquisition) can receive timing inputs from the processors, thus providing the flexibility of synchronizing latency of capture-trigger timing of individual dual-camera pairs with multiple structured-light projection modules. This allows image acquisition under the illumination by structured-light patterns from multiple views at the same time, thus making it possible to reconstruct a complete 3D representation of an object with minimized occlusion.

In addition to the example shown in FIG. 5, where the projectors of the multiple smart vision modules are positioned on the same plane, it is possible to have a cluster of smart vision modules positioned on different planes. For example, the support frame can have multiple intercepting arches, with each arch having multiple vision modules mounted on the arch. Alternatively, the support frame can include a dome structure, with each vision module being mounted at a particular location on top of the dome.

Figure 6:
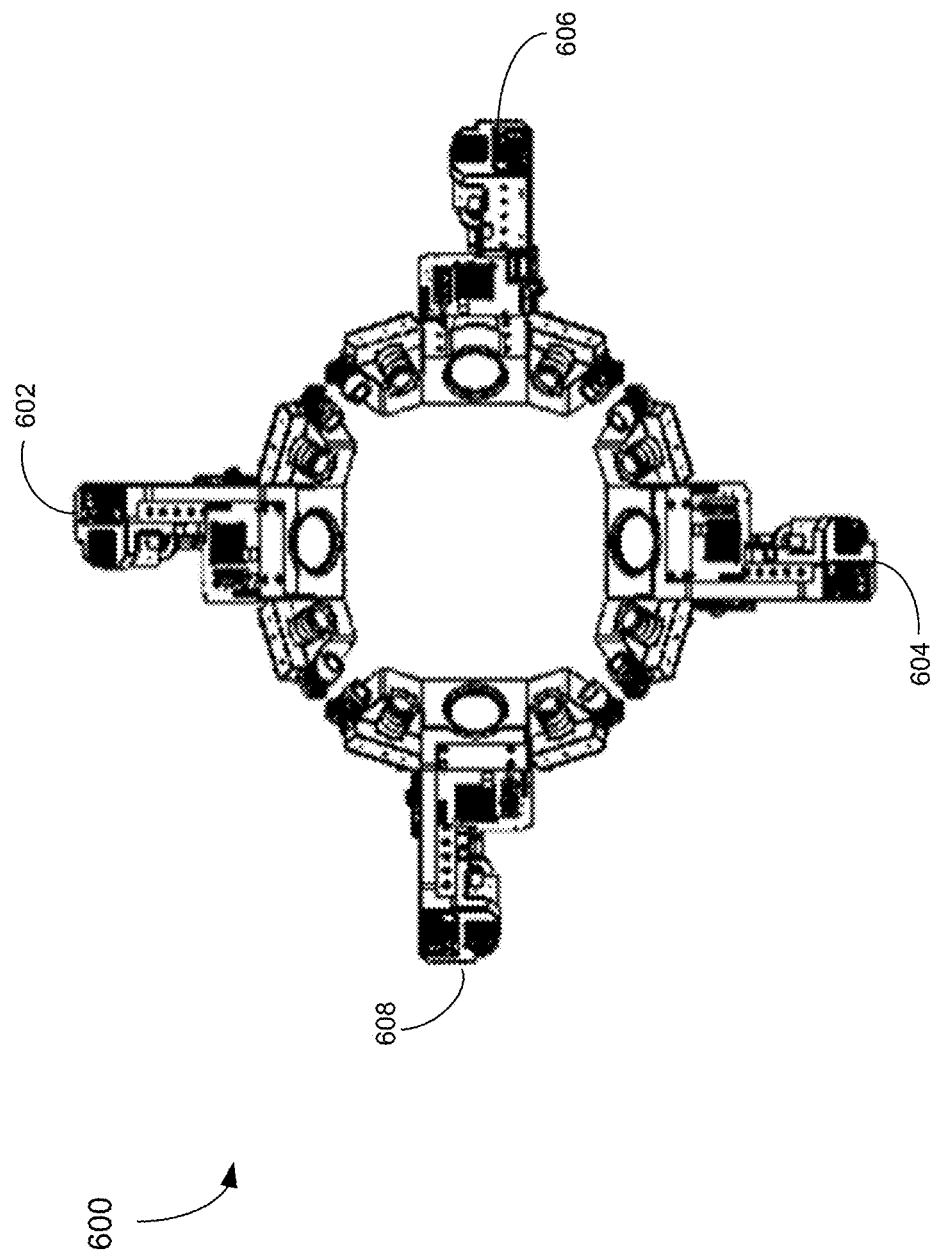
FIG. 6 illustrates the top view of an exemplary machine-vision system that includes a cluster of smart vision modules, according to one embodiment.

FIG. 6 illustrates the top view of an exemplary machine-vision system that includes a cluster of smart vision modules, according to one embodiment. In FIG. 6, machine-vision system 600 can include four smart vision modules, modules 602, 604, 606, and 608. Each vision module can be similar to the one shown in FIGS. 1A and 1B. Similar to the machine-vision system shown in FIG. 5, the different vision modules in machine-vision system 600 can operate independently of each other or in tandem. The additional vision modules can provide additional viewing options, making it easier to reconstruct a complete 3D representation (e.g., a 3D point cloud) of the object. Moreover, the ability to position vision modules in any desired location to have any viewing angle can also provide six degrees of freedom (6DOF).

As discussed previously, each smart vision module can include a processor, which can be enclosed within the same physical enclosure of the cameras, as shown in FIG. 1B. Such an on-board processor enables edge computing with board-level integration of all data-acquisition modules of the cameras. In the example shown in FIG. 1B, image-acquisition-and-processing board 110 can integrate the processor and the image-acquisition onto a single printed circuit board (PCB), and it can be included in the same physical enclosure that houses the projector and the cameras. Such an integrated board can provide high data throughput in terms of image capturing and processing. Integrating the real time 3D image acquisition and processing modules into the same unit can significantly reduce latency, and can also make the unit portable and provide flexibility to integrate with many robotic systems and/or other transport vehicles. Note that the reduced latency is an important factor in ensuring real-time 3D object tracking.

Figure 7:
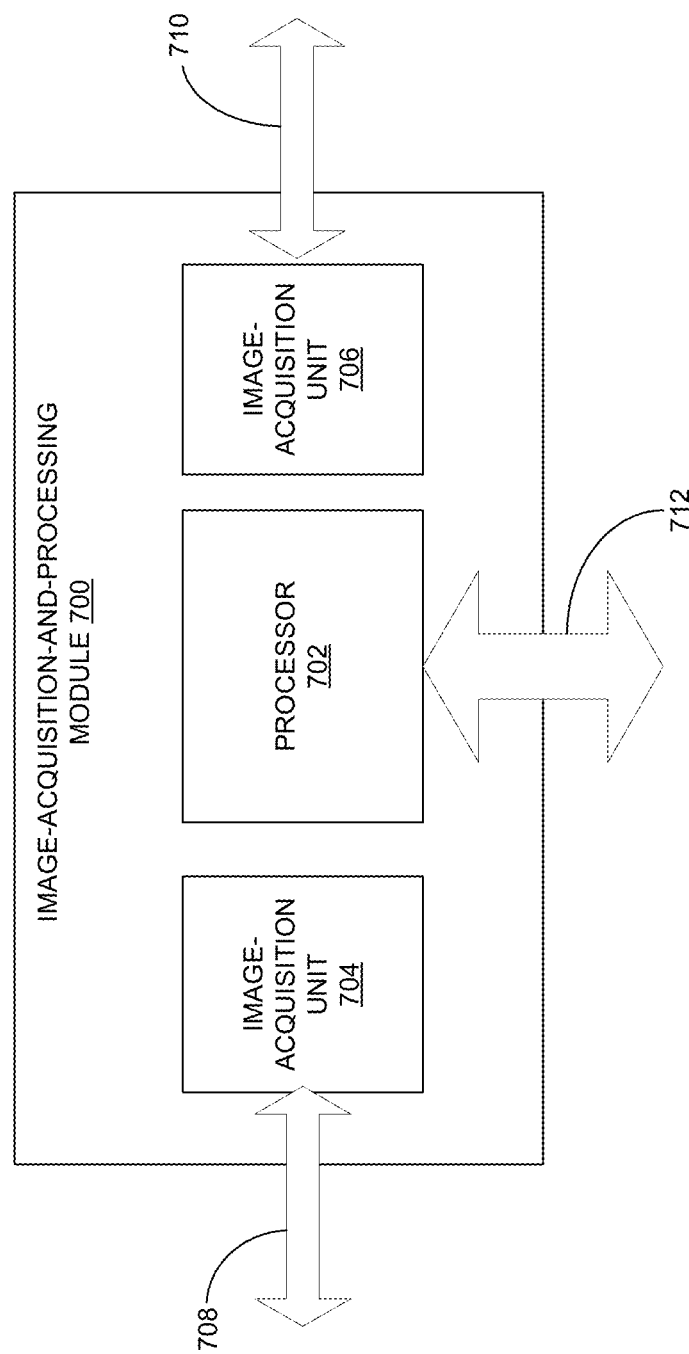
FIG. 7 illustrates an exemplary image-acquisition-and-processing module, according to one embodiment.

FIG. 7 illustrates an exemplary image-acquisition-and-processing module, according to one embodiment. Image-acquisition-and-processing module 700 can include an on-board processor 702 and two separate image-acquisition units 704 and 706. Each of the image-acquisition units can include an application-specific integrated circuit (ASIC) chip. Processor 702 and image-acquisition units 704 and 706 can be mounted onto a single board, which can be custom designed or a standard CPU board. In some embodiments, image-acquisition-and-processing module 700 can also include a memory (not shown in FIG. 7) that can be shared between image-acquisition units 704 and 706. The memory can store instructions that can be loaded into processor 702 to facilitate processor 702 in performing computation (e.g., image processing). It is also possible to temporarily store images captured by the cameras in the memory.

Image-acquisition-and-processing module 700 can also include a number of high-speed interfaces, such as image-sensor interfaces 708 and 710 and processor interface 712.

Image-sensor interfaces 708 and 710 enable, respectively, image-acquisition units 704 and 706 to interface with the two cameras. More specifically, images captured by the cameras are transmitted to image-acquisition units 704 and 706 via image-sensor interfaces 708 and 710, respectively. Eventually the image data is transferred, at a high speed, to processor 702 for processing. Similarly, control signals that control the operations of the cameras (e.g., the capturing of images, the shutter speed, the focus, etc.) can be sent to the cameras via image-sensor interfaces 708 and 710.

On the other hand, processor interface 712 allows processor 702 to interface with a host computer. For example, the image-processing result generated by processor 702 can be sent to the host computer. The host computer can combine image-processor results from multiple different processors (e.g., the different processors belonging to different vision modules) in order to construct a complete 3D image (e.g., a 3D point cloud) of the object that is under observation.

In some embodiments, the various interfaces can be high-speed data interfaces, such as peripheral component interconnect express (PCIe) interfaces. In one embodiment, image-sensor interfaces 708 and 710 can each run at a speed of about 2.8 Gbps, and processor interface 712 can run at a speed of about 5.6 Gbps. Such high data-communication speeds are important in ensuring the operation speed of the entire machine-vision system.

Figure 8:
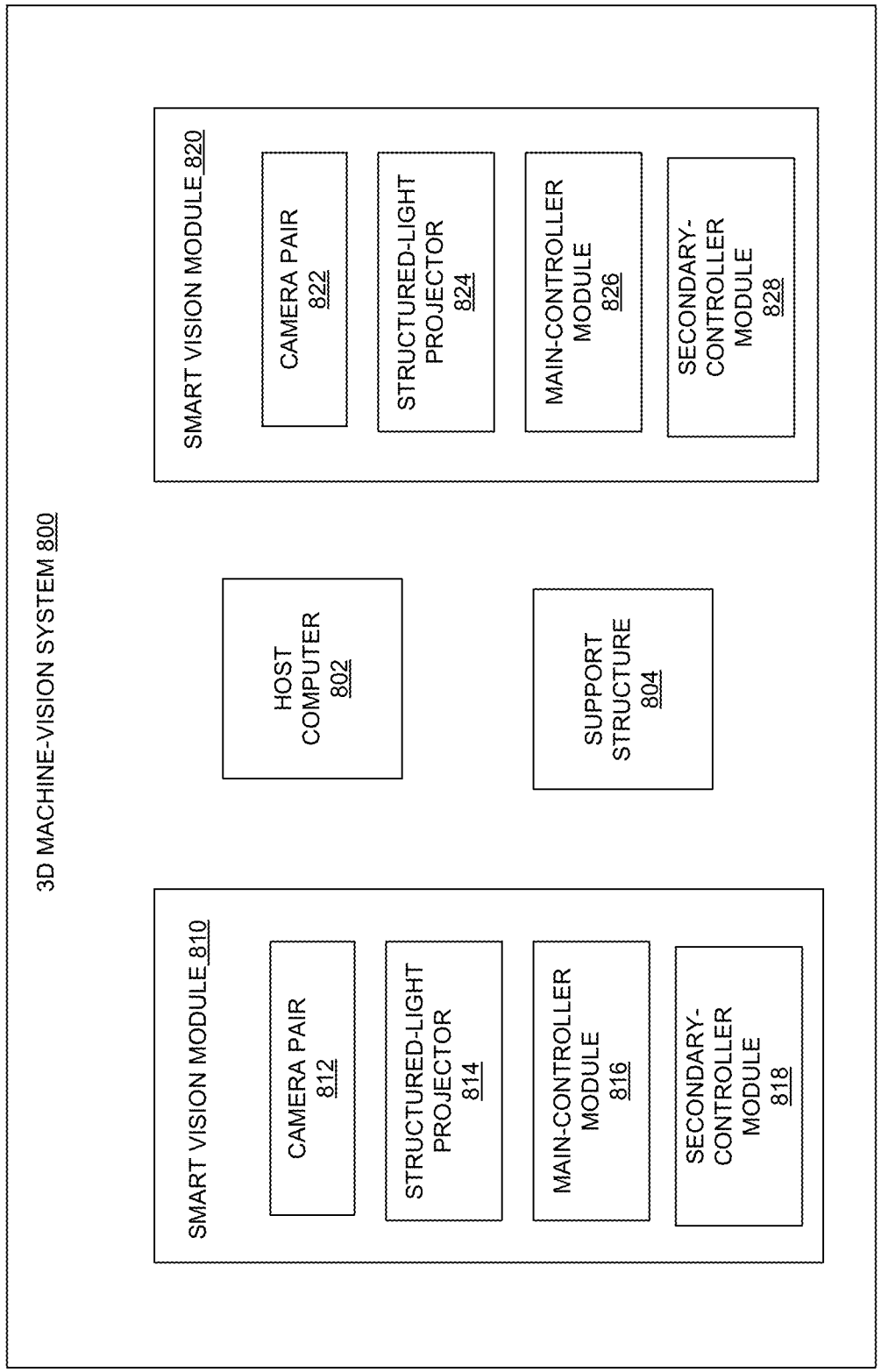
FIG. 8 shows a block diagram of an exemplary 3D machine-vision system, according to one embodiment.

FIG. 8 shows a block diagram of an exemplary 3D machine-vision system, according to one embodiment. 3D machine-vision system 800 can include a host computer 802, a support structure 804, and multiple smart vision modules (e.g., vision modules 810 and 820) in communication with host computer 802 and mounted on support structure 804.

The multiple vision modules can each be a stand-alone module, and can be configured to operate independently of each other or in tandem. Smart vision module 810 can include a camera pair 812, a structured-light projector 814, a main-controller module 816, and a secondary-controller module 818. Similarly, smart vision module 820 can include a camera pair 822, a structured-light projector 824, a main-controller module 826, and a secondary-controller module 828.

Each camera pair can include two cameras with high data speed (e.g., greater than 2.8 Gbps), high-resolution (e.g., greater than 2.8 M pixels), and high frame rate (e.g., 400 frames per second or higher). The camera pair can provide stereo vision even when the structured-light projector is not on. This can allow for faster object identification and tracking, whereas structured-light based image capturing can provide 3D images at a higher resolution. In some embodiments, it is also possible for each smart vision module to include multiple camera pairs capable of providing images at different resolutions.

Each structured-light projector can include a laser-and-collimator module, an optical modulator (which can include a diffuser and a light tunnel), a DMD, a prism, and a beam expander. In some embodiments, the optical modulator can include two partially overlapping diffuser discs rotating at different speeds in opposite directions. Each diffuser disc can be driven by a BLDC motor mounted using FDBs, thus enabling the diffuser disc to spin with low-noise and minimum wobbling. The random patterns etched on the diffuser discs can be designed to ensure a narrow divergence angle (e.g., between 0.5° and 10°). Including the optical diffuser discs in the path of the laser beam can eliminate laser speckles and improve the uniformity of the structured-light patterns.

Each main-controller module can be similar to image-acquisition-and-processing module 700 shown in FIG. 7. More specifically, each main-controller module can include a processor, a memory, and multiple image-acquisition units, with each image-acquisition unit interfacing with a camera. The processor can be used to process data provided by image sensors of the cameras using various digital image processing technologies, such as filtering, applying various structured-light algorithms, etc. The processor can also combine data from the different cameras to eliminate specular reflections captured by each single camera. The processor can also use the image data to generate a 3D point cloud for the object being observed. Depending on the resolution of the image data, a low- or high-resolution 3D point cloud can be generated. The main-controller module of each vision module can be enclosed in a same physical enclosure that houses the cameras and projector of the vision module, thus providing portability of the vision module while reducing data latency.

Each secondary-controller module can include controllers for other components in the corresponding smart vision system, such as a laser controller for controlling the laser (e.g., emitting wavelength and intensity) within the structured-light projector, a DMD controller for controlling the DMD (e.g., the pattern and frame rate), and a diffuser controller for controlling the spin (e.g., direction and speed) of the diffuser discs. More specifically, the laser controller can control the emitting wavelength and intensity of the laser based on the surface condition of the object under observation. The DMD can be configured such that the projector can project different patterns (e.g., dot arrays, parallel lines, grids, etc.) on to the object. The DMD frame rate can be 10-20 frames per second, or higher. Diffuser controllers can be configured in such a way that two diffuser discs in the diffuser module spin at high RPM (e.g., hundreds or thousands of RPM) in opposite directions. The various controllers within the secondary controller module can also be integrated onto a PCB.

Figure 9:
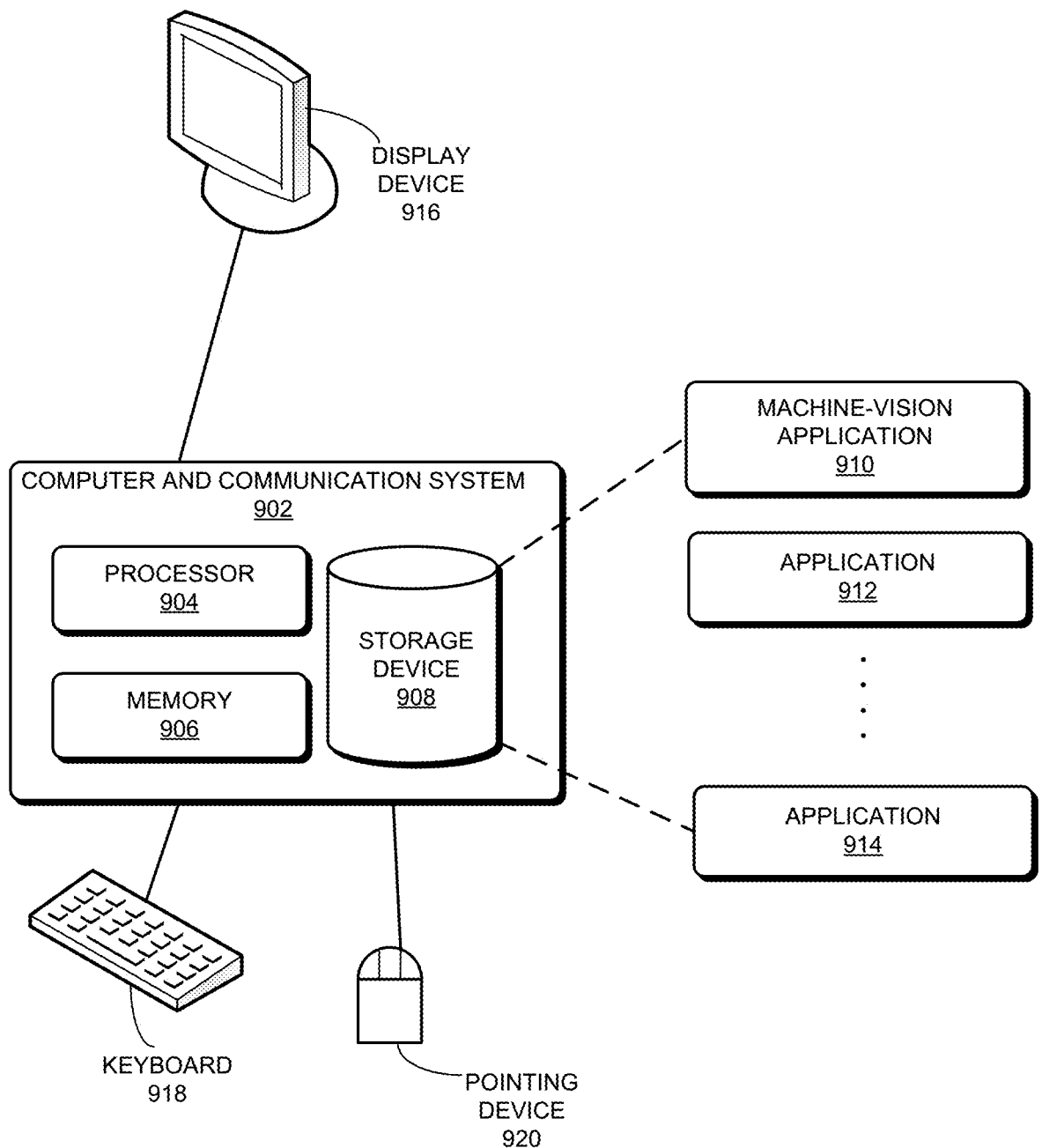
FIG. 9 illustrates an exemplary computer and communication system that facilitates the 3D machine-vision system, according to one embodiment.

FIG. 9 illustrates an exemplary computer and communication system that facilitates the 3D machine-vision system, according to one embodiment. A computer and communication system 902 includes a processor 904, a memory 906, and a storage device 908. Storage device 908 stores various applications that can be used to facilitate operations of the 3D machine-vision system, such as a machine-vision application 910, as well as other applications, such as applications 912 and 914. During operation, machine-vision application 910 can be loaded from storage device 908 into memory 906 and then executed by processor 904. While executing the program, processor 904 performs the aforementioned functions. Computer and communication system 902 is coupled to an optional display 916, keyboard 918, and pointing device 920.

In general, embodiments of the present application can provide a 3D machine-vision system that can be used to facilitate operations of a robotic system. The 3D machine-vision system can include a DMD-based structured-light projection system that uses a high power, multimode, multi-wavelength laser module as a light source. The structured-light projection system can also include an optical diffuser with a narrow divergence angle to reduce or eliminate speckles. The optical diffuser can include two low-noise, high-RPM, vibration-free rotating discs driven by BLDC motors mounted using FDBs. The compact size and stability of the BLDC motors make it possible for the diffuser discs to be positioned very close to the laser source, thus further reducing beam divergence. The structured-light projection system uses a high resolution double-telecentric lens system to expand the laser beam and a DMD to generate high-resolution structured-light patterns. Such structured-light patterns can include digitized patterns (e.g., binary patterns) or analog patterns where light intensity changes gradually. Moreover, the disclosed embodiments provide board-level integration of multiple cameras having high data speed (e.g., greater than 2.8 Gbps), high frame rate (e.g., greater than 400 frames-per-second), and high resolution (e.g., greater than 2.8 M pixels) to enable high resolution 3D point cloud generation in real time, for six degrees of freedom (6DOF) 3D object identification, 3D tracking, and localization. By integrating a processor and image-acquisition modules on to the same board, the disclosed embodiments minimize latency in data processing and transferring.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A machine-vision system, comprising one or more stereo-vision modules, wherein a respective stereo-vision module comprises:
   a structured-light projector;
   a first camera positioned on a first side of the structured-light projector; and
   a second camera positioned on a second side of the structured-light projector, wherein the first and second cameras are configured to capture images of an object under illumination by the structured-light projector;
   wherein the structured-light projector comprises a laser-based light source and an optical modulator configured to reduce speckles caused by the laser-based light source;
   wherein the optical modulator comprises two rotating diffuser discs arranged with edges partially overlapping with each other; and
   wherein the two edge overlapping diffuser discs rotate at different speeds in opposite directions.

2. The machine-vision system of claim 1, wherein the optical modulator further comprises a straight or curved light tunnel.

3. The machine-vision system of claim 1, wherein rotation speeds of the two diffuser discs are controlled independently of each other.

4. The machine-vision system of claim 1, wherein a respective rotating diffuser disc is driven by a brushless direct current (BLDC) motor.

5. The machine-vision system of claim 1, wherein the laser-based light source is configured to emit a multimode, multi-wavelength laser beam.

6. The machine-vision system of claim 1, further comprising a support frame to mount the one or more stereo-vision modules, wherein the support frame comprises at least an arc-shaped slot such that first and second stereo-vision modules mounted on the arc-shaped slot have a same viewing distance but different viewing angles when capturing images of the object.

7. The machine-vision system of claim 6, wherein optical axes of the first and second cameras of the first and second stereo-vision modules mounted on the arc-shaped slot are configured to converge at a single point.

8. The machine-vision system of claim 6, wherein the first and second stereo-vision modules operate in tandem, with the first stereo-vision module operating as a master and the second stereo-vision module operating as a slave.

9. The machine-vision system of claim 8, wherein, while operating as a slave, the second stereo-vision module is configured to:
   turn off a structured-light projector of the second stereo-vision module; and
   synchronize first and second cameras of the second stereo-vision module with a structured-light projector of the first stereo-vision module.

10. The machine-vision system of claim 1, wherein the structured-light projector comprises:
    a digital micromirror device (DMD) for reflecting a laser beam outputted by the laser-based light source and modulated by the optical modulator; and
    a double-telecentric lens for expanding the laser beam reflected by the DMD while maintaining parallelism of the laser beam.

11. The machine-vision system of claim 1, wherein the respective stereo-vision module further comprises an image-acquisition-and-processing module, which comprises a processor and multiple image-acquisition units integrated onto a same printed circuit board (PCB).

12. The machine-vision system of claim 11, wherein the image-acquisition-and-processing module comprises:
    an image-sensor interface configured to facilitate high-speed data transfer to the processor; and
    a processor interface configured to facilitate high-speed communication between the processor and a host computer.

13. The machine-vision system of claim 12, wherein the image-sensor interface and the processor interface are peripheral component interconnect express (PCIe) interfaces.

14. A structured-light projector for a 3D imaging system, comprising:
    a laser-based light source;
    an optical modulator configured to reduce speckles caused by coherence of the laser-based light source;
    a digital micromirror device (DMD) for reflecting a laser beam outputted by the laser-based light source and modulated by the optical modulator; and
    a double-telecentric lens for expanding the laser beam reflected by the DMD while maintaining parallelism of the laser beam;
    wherein the optical modulator comprises two rotating diffuser discs arranged with edges partially overlapping with each other; and
    wherein the two edge overlapping diffuser discs rotate at different speeds in opposite directions.

15. The structured-light projector of claim 14, wherein the optical modulator further comprises a straight or curved light tunnel.

16. The structured-light projector of claim 14, wherein rotation speeds of the two diffuser discs are controlled independently of each other.

17. The structured-light projector of claim 14, wherein a respective rotating diffuser disc is driven by a brushless direct current (BLDC) motor.

18. The structured-light projector of claim 14, wherein the laser-based light source is configured to emit a multimode, multi-wavelength laser beam.

* * * * *